United States Patent
Digel et al.

(10) Patent No.: US 9,678,356 B2
(45) Date of Patent: Jun. 13, 2017

(54) PROJECTION SCREEN APPARATUS, PROJECTION APPARATUS, AND PROJECTION METHOD

(71) Applicant: Robert Bosch GmbH, Stuttgart (DE)

(72) Inventors: Tobias Digel, Reutlingen (DE); Cedric Lubenow, Gomaringen (DE); Frank Fischer, Gomaringen (DE); Martin Edel, Stuttgart-Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/996,486

(22) Filed: Jan. 15, 2016

(65) Prior Publication Data
US 2016/0209669 A1 Jul. 21, 2016

(30) Foreign Application Priority Data
Jan. 21, 2015 (DE) .................. 10 2015 200 929

(51) Int. Cl.
| G02B 27/48 | (2006.01) |
| G03B 21/56 | (2006.01) |
| G02B 5/02 | (2006.01) |
| G03B 21/608 | (2014.01) |

(52) U.S. Cl.
CPC ........... *G02B 27/48* (2013.01); *G02B 5/0278* (2013.01); *G03B 21/562* (2013.01); *G03B 21/608* (2013.01)

(58) Field of Classification Search
CPC .............................. G03B 21/562; G03B 21/608
USPC .......................................................... 359/446
See application file for complete search history.

(56) References Cited

U.S. PATENT DOCUMENTS

| 3,640,602 | A | * | 2/1972 | Wolfe ..................... G03B 21/62 359/446 |
| 4,317,618 | A | * | 3/1982 | Murakoshi ............. G03B 21/56 359/446 |
| 4,401,368 | A | * | 8/1983 | Drechsel .............. G03B 21/608 359/446 |
| 2008/0117505 | A1 | * | 5/2008 | Sandburg ............... G03B 21/60 359/446 |
| 2013/0010356 | A1 | | 1/2013 | Curtis et al. |
| 2016/0246154 | A1 | * | 8/2016 | O'Keeffe ................ G02F 1/167 |

* cited by examiner

*Primary Examiner* — Christopher Mahoney
(74) *Attorney, Agent, or Firm* — Norton Rose Fulbright US LLP; Gerard Messina

(57) ABSTRACT

A projection screen apparatus has: a display panel having an external panel surface and an internal panel surface; an actuator device by way of which an oscillating motion is impartable to at least a part of the projection screen apparatus; a diffuser screen, disposed adjacently to the internal panel surface, to which the oscillating motion with respect to the display panel is imparted by way of the actuator device; and a gap between the internal panel surface of the display panel and an inner surface of the diffuser screen directed toward the internal panel surface being filled at least in part with at least one viscoelastic filler material.

13 Claims, 2 Drawing Sheets

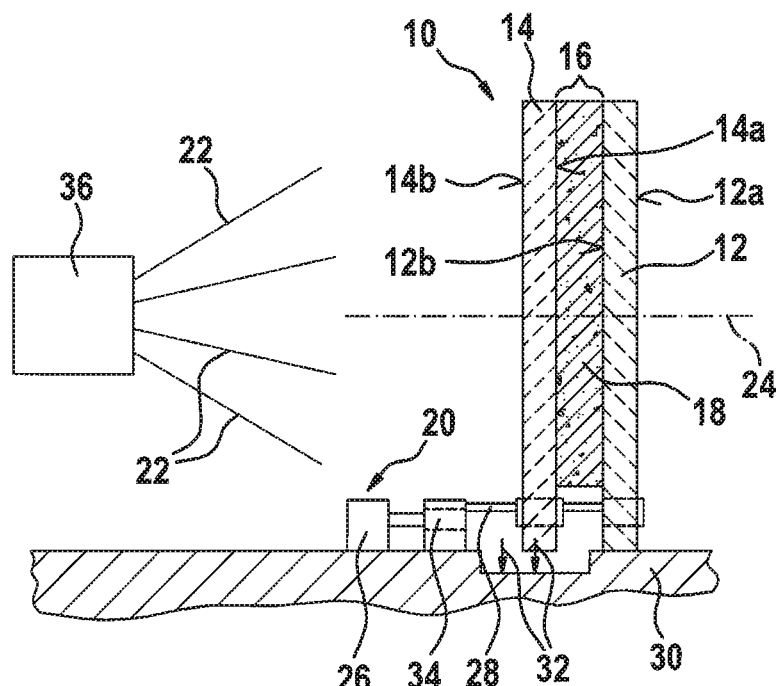
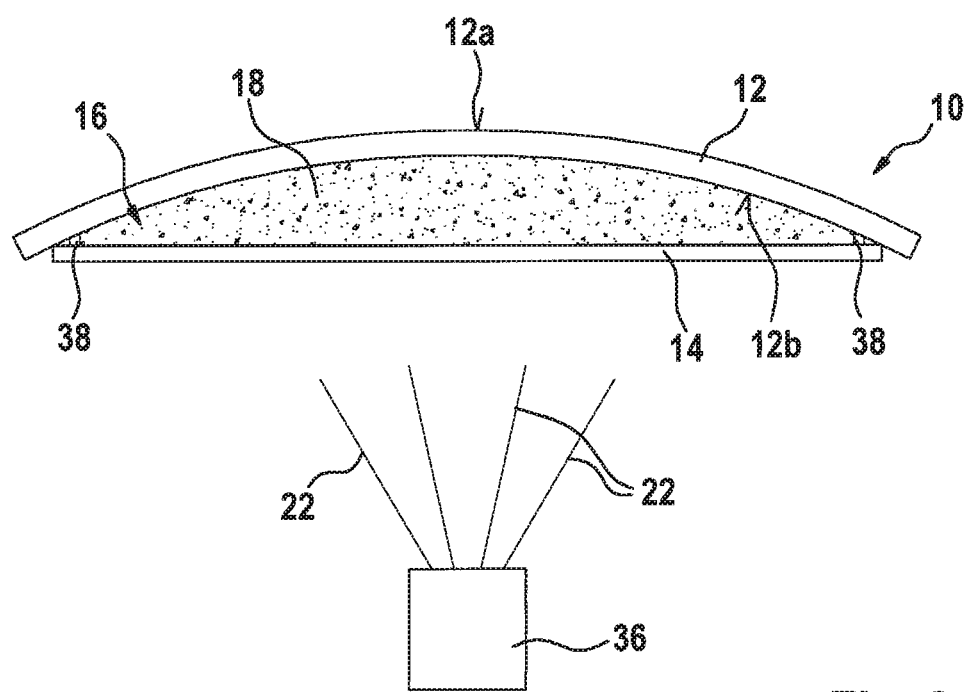

PROJECTION SCREEN APPARATUS, PROJECTION APPARATUS, AND PROJECTION METHOD

BACKGROUND OF THE INVENTION

1. Field of the Invention

The present invention relates to a projection screen apparatus. The invention likewise relates to a projection apparatus. The invention furthermore relates to a projection method.

2. Description of the Related Art

US Patent Application Publication 2013/0010356 A1 describes a display screen and an apparatus interacting therewith. The entire display screen is intended to have vibrations imparted to it by way of the apparatus in such a way that when an image is simultaneously projected onto the display screen, an occurrence of a granularity, which is also often referred to as "speckle," is suppressed. For example, the entire display screen has vibrations, in particular a resonant oscillation, imparted to it by the emission of sound waves by way of the apparatus.

BRIEF SUMMARY OF THE INVENTION

The present invention creates capabilities for projecting a clear and speckle-free image onto the display panel. Thanks to the imparting, achievable by way of the present invention, of a uniform oscillating motion (with no reversing points) to the diffuser screen, the speckle of the light/laser light projected onto the display panel can be minimized. As discussed in more detail below, occurrence of a so-called "double image" is furthermore prevented as a result of the at least one viscoelastic filler material introduced into the gap. Multiple reflections of at least one image spot projected onto the display panel is also reliably prevented by way of the at least one viscoelastic filler material introduced into the gap. Transmittance can also be increased by the prevention of multiple reflections. This can considerably contribute, in particular, to improving a recognizability of at least one displayed image symbol and/or to improving a readability of at least one displayed word. The at least one viscoelastic filler material in the gap also ensures the desired damped amplitude of the oscillating motion, generated by way of the actuator device, of the diffuser screen.

An improvement in fragmentation safety for the display panel can also be achieved by way of the at least one viscoelastic filler material introduced into the gap. Even in the event of a breakage of the display panel, fragments of the display panel adhere with high probability to the at least one viscoelastic filler material, so there is no risk of undesired distribution of the fragments into an environment of the projection screen apparatus. In particular, sharp-edged fragments of the broken display panel are, as a rule, automatically pressed into the at least one viscoelastic material during breakage of the display panel, in such a way that they remain strongly adhered thereto. A risk of personal injury during/after breakage/fragmentation of the display panel is thus negligibly low. It is also noted, for the sake of completeness, that the at least one viscoelastic filler material can often yield to and damp an impact exerted on the display panel in such a way that the risk of a breakage/fragmentation of the display panel due to the impact is reduced.

As a result of the advantages described in the preceding paragraph, the subjects of the present invention can also be used in a vehicle interior. The display panel can be embodied, for example, as a speedometer display or as a center console. Also advantageous is use of the display panel as an external component of a combination instrument. It is also noted that because of the advantageous fragmentation safety of the display panel, a glass panel is usable as a display panel. An inexpensive glass material can furthermore be used to constitute the display panel. The present invention thus also makes it possible to constitute vehicle interior components from an inexpensive glass material.

Preferably the at least one viscoelastic filler material is transparent to wavelengths in the visible range. Introduction of the at least viscoelastic filler material into the gap thus does not degrade an image quality of an image/film projected onto the display panel.

For example, the at least one viscoelastic filler material can have an optical refractive index of between 1.2 and 1.6 for wavelengths in the visible range. In particular, the at least one viscoelastic filler material can have an optical refractive index of between 1.3 and 1.5 for wavelengths in the visible range. The refractive index of the at least one viscoelastic filler material can thus be (almost) identical to the refractive index of the display panel. This prevents the occurrence of an undesired double image or a multiple reflection upon projection of an image/film through the at least one viscoelastic filler material onto the display panel. As already discussed above, prevention of multiple reflections also contributes to increased transmittance, to an improvement in recognizability of at least one displayed image symbol, and/or to improved readability of at least one displayed word.

In an advantageous embodiment, the projection screen apparatus can encompass an adhesive, a silicone gel, and/or acrylic as the at least one viscoelastic filler material. Inexpensive materials are thus usable as the at least one viscoelastic filler material.

In a further advantageous embodiment, a rotation around a rotation axis intersecting the diffuser screen and the display panel is impartable to the diffuser screen by way of the actuator device as the oscillating motion with respect to the display panel. For example, the diffuser screen can be linked via at least one crankshaft to an electric motor constituting at least part of the actuator device, in such a way that the rotation with respect to the display panel around the rotation axis intersecting the diffuser screen and the display panel is impartable to the diffuser screen. The actuator device is thus easy and inexpensive to manufacture. It is noted, however, that the equipping of the actuator device with the electric motor and the linking of the diffuser screen via the at least one crankshaft, as described here, are to be interpreted as merely exemplifying.

In an alternative embodiment that is likewise very advantageous, the oscillating motion with respect to the display panel is impartable to the diffuser screen by way of the actuator device in such a way that a distance between the diffuser screen and the display panel is periodically variable. For example, at least one piezo can be used as at least part of the actuator device in order to implement this kind of oscillating motion of the diffuser screen with respect to the display panel. The equipping of the actuator device with the at least one piezo as described here is, however, also to be interpreted as merely exemplifying.

The display panel can furthermore have at least one rounded external panel surface. The internal panel surface of the display panel can also be rounded. The external panel surface and/or the internal panel surface can, however, also be embodied to be smooth.

The advantages described above are also ensured in a projection apparatus having a projection screen apparatus of this kind and having a light-emitting device with which at least one light beam is projectable through the diffuser screen onto the display panel.

Execution of a corresponding projection method furthermore also creates the above-described advantages. It is noted that the projection method is refinable in accordance with the embodiments explained above of the projection screen apparatus.

BRIEF DESCRIPTION OF THE DRAWINGS

FIG. 1 schematically depicts a first embodiment of the projection screen apparatus.

FIG. 2 schematically depicts a second embodiment of the projection screen apparatus.

DETAILED DESCRIPTION OF THE INVENTION

Figure 3:
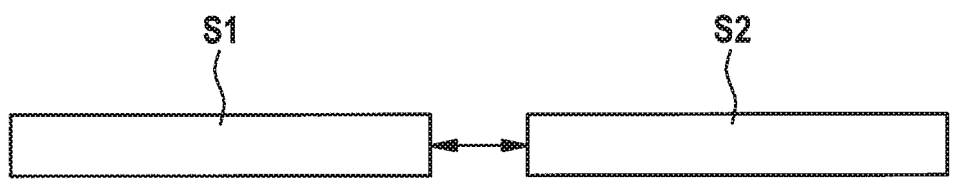
FIG. 3 is a flow chart to explain an embodiment of the projection method.

FIG. 1 schematically depicts a first embodiment of the projection screen apparatus.

Projection screen apparatus 10 (e.g. a projection screen or display screen) depicted schematically in FIG. 1 has a display panel 12 having an external panel surface 12a and an internal panel surface 12b. Panel surfaces 12a and 12b of display panel 12 can be understood in particular as the two maximal (external) surfaces of display panel 12. In the embodiment of FIG. 1, external panel surface 12a and internal panel surface 12b are each smooth. Display panel 12 can be embodied in particular as a "smooth" panel, for example as a parallelepipedal panel or as a cylindrical panel. Further possibilities for the shape of display panel 12 are described below.

Display panel 12 can be, in particular, a glass panel (made, especially, of an inexpensive glass material). It is noted, however, that any material transparent to wavelengths in the visible range is usable for manufacturing display panel 12. The range of embodiment of display panel 12 is also not limited to a specific optical refractive index for wavelengths in the visible range. Display panel 12 can have, for example, an optical refractive index of between 1.2 and 1.6 for wavelengths in the visible range. Display panel 12 can in particular have an optical refractive index of between 1.3 and 1.5. The optical refractive index of display panel 12 can especially be 1.4.

Projection screen apparatus 10 has a diffuser screen 14 disposed adjacent to internal panel surface 12b of display panel 12. A gap 16 exists between internal panel surface 12b of display panel 12 and an internal surface 14a, directed toward internal panel surface 12b, of diffuser screen 14. Gap 16 is filled at least in part with at least one viscoelastic filler material 18.

Projection screen apparatus 10 also encompasses an actuator device 20 with which an oscillating motion with respect to display panel 12 is impartable to diffuser screen 14. This prevents an occurrence of speckling, or an undesired granularity, in an image projected through diffuser screen 14 onto display panel 12. It is furthermore noted that diffuser screen 14, to which the oscillating motion is imparted, is located relatively close to display panel 12, at most a slight expansion of a light beam/laser beam 22 projected through diffuser screen 14 onto display panel 12 is to be expected. A coherence in time and space of light beam/laser beam 22 projected through diffuser screen 14 onto display panel 12 is thus decreased by diffuser screen 14 to which the oscillating motion is imparted by way of actuator device 20. The advantageous optical properties of laser light can thus also be used to project an image or a film through diffuser screen 14 onto display panel 12.

Actuator device 20 is preferably designed to impart the oscillating motion to diffuser screen 14 in such a way that display panel 12 remains stationary. The oscillating motion of diffuser screen 14 with respect to display panel 12 can thus be paraphrased as an oscillating motion only of diffuser screen 14. A user utilizing projection screen apparatus 10, for example a driver using projection screen apparatus 10 in his or her vehicle interior, is thus not irritated by oscillating motions or vibrations of display panel 12. Display panel 12 can therefore also be a speedometer display or a center console. Utilization of display panel 12 as an external component of a combination instrument is likewise advantageous.

During the operation of projection screen apparatus 10, display panel 12 also serves as a protective barrier for diffuser screen 14 to which oscillation is imparted. Because projection screen apparatus 10 is used, as a rule, in such a way that display panel 12 conceals diffuser screen 14 with respect to a user of projection screen apparatus 10, a user looking at external panel surface 12a or touching external panel surface 12a does not notice the oscillating motion of diffuser screen 14. In addition, actuator device 20 can also be installed on projection screen apparatus 10 in such a way that display panel 12 conceals actuator device 20 with respect to the user of projection screen apparatus 10. There is thus a very low risk of damage to actuator device 20 during operation of projection screen apparatus 10, even if the user bumps against projection screen apparatus 10.

Diffuser screen 14 can be embodied with a smooth internal surface 14a and/or with a smooth external surface 14b directed away from internal surface 14a. Internal surface 14a and/or external surface 14b of diffuser screen 14 can, however, also be rounded and structured. ("Internal surface 14a" and "external surface 14b" of diffuser screen 14 can be understood, in particular, as the two maximal external surfaces or areas of diffuser screen 14.) The manufacturability of diffuser screen 14 is not limited to a specific material.

By way of the at least one viscoelastic filler material 18 present in gap 16, the undesired occurrence of a double image or a multiple reflection during projection of an image or a film through diffuser screen 14 (and gap 18) onto display panel 12 can be prevented. Gap 16 is preferably filled at least in part with the at least one viscoelastic filler material 18 in such a way that at least a partial region of gap 16, which is delimited on a first side by at least a partial area of internal panel surface 12b of display panel 12 and on a second side, directed away from the first side, by at least a partial area of internal surface 14a of diffuser screen 14, is completely filled with the at least one viscoelastic filler material 18. The partial region of gap 16 through which light beams/laser beams 22 proceed from diffuser screen 14 to display panel 12 can in particular be completely filled with the at least one viscoelastic filler material 18. This is ensured especially when gap 16 is completely filled with the at least one viscoelastic filler material 18.

The at least one viscoelastic filler material 18 is preferably transparent to wavelengths in the visible range. The at least one viscoelastic filler material thus makes little or no contribution to an intensity loss of a light beam/laser beam 22 directed through the at least one viscoelastic filler material 18 onto display panel 12. An optical refractive index that is (almost) identical to the optical refractive index of display panel 12 is preferred for the at least one viscoelastic filler material 18. For example, the at least one viscoelastic filler material 18 can have an optical refractive index of between 1.2 and 1.6, in particular an optical refractive index of between 1.3 and 15, for wavelengths in the visible range. For an optical refractive index of display panel 12 (e.g. a glass panel) of 1.4, for example, the at least one viscoelastic filler material 18 likewise has an optical refractive index of 1.4. The quantitative values recited here are, however, to be interpreted as merely exemplifying.

The at least one viscoelastic filler material 18 can be, in particular, an adhesive, a silicone gel, and/or acrylic. Inexpensive materials are thus usable as the at least one viscoelastic filler material 18. The materials enumerated here for the at least one viscoelastic filler material 18 also ensure a "soft" filling of gap 16, thereby ensuring good displaceability of diffuser screen 14 with respect to display panel 12. The materials enumerated here also provide the fragmentation safety already explained above.

In the embodiment of FIG. 1, a rotation in which diffuser screen 14 rotates eccentrically is impartable to diffuser screen 14 by way of actuator device 20. All points of diffuser screen 14 thus move on a circular path during the rotation of diffuser screen 14. (Display panel 12 remains stationary during the rotation of diffuser screen 14 around rotation axis 24.)

In order to implement the desired rotation of diffuser screen 14 around rotation axis 24 with respect to display panel 12, actuator device 20 has, in the embodiment of FIG. 1, an electric motor 26. Diffuser screen 14 is furthermore linked to electric motor 26, via at least one crankshaft 28, in such a way that the rotation around rotation axis 24 with respect to display panel 12 is impartable to diffuser screen 14 by way of an operation of electric motor 26. In particular, the desired rotation around rotation axis 24 with respect to display panel 12 can be imparted in stable fashion to diffuser screen 14 by way of two crankshafts 28, of which a first crankshaft 28 abuts against internal surface 14a of diffuser screen 14 and a second crankshaft 28 against external surface 14b of diffuser screen 14. The two crankshafts 28 can be driven synchronously by way of the at least one electric motor.

By way of example, in the embodiment of FIG. 1 display panel 12 is mounted on a holder 30, while diffuser screen 14 is suspended by way of the two crankshafts 28 above a recess 32 embodied in holder 30. Sufficient clearance for the rotation of diffuser screen 14 around rotation axis 24 is thus ensured. First crankshaft 28 can be attached to display panel 12, while second crankshaft 28 is braced against a protrusion 34 of holder 30.

A rotation around a rotation axis 24 (e.g. intersecting diffuser screen 14 and display panel 12) can furthermore be impartable to diffuser screen 14 by way of actuator device 20 as the oscillating motion with respect to display panel 12. For example, rotation axis 24 can be directed perpendicularly to internal surface 14a of diffuser screen 14 and/or to external surface 14b, directed away from internal surface 14a, of diffuser screen 14. Rotation axis 24 can intersect internal surface 14a and/or external surface 14b, in particular, centeredly.

Projection screen apparatus 10 interacts with a light-emitting device 36 by way of which a light beam/laser beam 22 is projectable through diffuser screen 14 (and gap 16) onto display panel 12. A usability of projection screen apparatus 10 is not limited to a specific type of light-emitting device 36 for projecting an image or a film. Projection screen apparatus 10 can optionally be disposed together with light-emitting device 26 in/on a projection apparatus, or can interact with a light-emitting device 36 embodied as a separate device.

FIG. 2 schematically depicts a second embodiment of the projection screen apparatus.

As is evident in FIG. 2, display panel 12 can have at least one rounded external panel surface 12a. Display panel 12 of FIG. 2 can furthermore have both a rounded external panel surface 12a and a rounded internal panel surface 12b. Display panel 12 can be externally and/or internally rounded, but an external and internal rounding of display panel 12 is optional.

In the embodiment of FIG. 2, the oscillating motion with respect to display panel 12 is impartable to diffuser screen 14 by way of the actuator device (not depicted) in such a way that a distance between diffuser screen 14 and display panel 12 is periodically variable. The actuator device can have, for example, at least one piezo. Optionally, at least one edge joint 38, which frames the at least one filler material 18, can be embodied on display panel 12 and/or on diffuser screen 14. Undesired discharge of the at least one filler material 18 is reliably preventable by way of the at least one edge joint 38. A plurality of materials, for example silicone, can be used for the at least one edge joint 38.

Reference is made to the preceding embodiment regarding further possible properties of projection screen apparatus 10 of FIG. 2.

FIG. 3 is a flow chart to explain an embodiment of the projection method.

The projection method described below may be executed, for example, using one of the projection screen apparatuses described above, or with a projection apparatus equipped therewith. It is noted, however, that the implementability of the projection method is not limited to the projection screen apparatuses described above.

In a method step S1 of the projection method, an image and/or a film is projected onto a display panel. At least at times during method step S1, i.e. during projection of the image and/or film onto the display panel, a method step S2 is also executed. In method step S2, an oscillating motion with respect to the display panel is imparted to a diffuser screen, through which at least one light beam of the image and/or film projected onto the display panel is transmitted and which is spaced away from the panel surface by a gap filled at least in part with at least one viscoelastic filler material. For example, in method step S2 a rotation around a rotation axis (e.g. intersecting the diffuser screen and the display panel) is imparted to the diffuser screen as the oscillating motion with respect to the display panel. A rotation in which the diffuser screen rotates eccentrically is preferably impartable to the diffuser screen. All points on the diffuser screen can thereby move on a circular path. Alternatively, however, the oscillating motion with respect to the display panel can also be imparted to the diffuser screen in such a way that a distance between the diffuser screen and the display panel is periodically varied.

What is claimed is:
1. A projection screen apparatus, comprising:
    a display panel having an external panel surface and an internal panel surface;
    an actuator device imparting an oscillating motion to at least a part of the projection screen apparatus;
    a diffuser screen disposed adjacently to the internal panel surface, to which diffuser screen the oscillating motion with respect to the display panel is imparted by the actuator device; and a gap between the internal panel surface of the display panel and an inner surface of the diffuser screen directed toward the internal panel surface, the gap being filled at least in part with at least one viscoelastic filler material having an optical refractive index substantially identical to that of the display panel.

2. The projection screen apparatus as recited in claim 1, the at least one viscoelastic filler material being transparent to wavelengths in the visible range.

3. The projection screen apparatus as recited in claim 2, the at least one viscoelastic filler material having an optical refractive index of between 1.2 and 1.6 for wavelengths in the visible range.

4. The projection screen apparatus as recited in claim 3, the at least one viscoelastic filler material having an optical refractive index of between 1.3 and 1.5 for wavelengths in the visible range.

5. The projection screen apparatus as recited in claim 2, wherein the at least one viscoelastic filler material includes at least one of an adhesive, a silicone gel, and acrylic.

6. The projection screen apparatus as recited in claim 2, wherein:
a rotation, around a rotation axis, of the diffuser screen with respect to the display panel is imparted by the actuator device.

7. The projection screen apparatus as recited in claim 6, the diffuser screen being linked via at least one crankshaft to an electric motor constituting at least part of the actuator device in such a way that the rotation, around the rotation axis, of the diffuser screen with respect to the display panel is imparted by operation of the electric motor.

8. The projection screen apparatus as recited in claim 2, the oscillating motion with respect to the display panel being imparted to the diffuser screen by the actuator device in such a way that a distance between the diffuser screen and the display panel is periodically varied.

9. The projection screen apparatus as recited in claim 8, the display panel having at least one rounded external panel surface.

10. The projection screen apparatus as recited in claim 2, wherein the at least one viscoelastic filler material includes an adhesive.

11. The projection screen apparatus as recited in claim 2, wherein the at least one viscoelastic filler material includes an acrylic.

12. A projection system, comprising:
a projection screen apparatus having:
a display panel having an external panel surface and an internal panel surface;
an actuator device imparting an oscillating motion to at least a part of the projection screen apparatus;
a diffuser screen disposed adjacently to the internal panel surface, to which diffuser screen the oscillating motion with respect to the display panel is imparted by the actuator device; and
a gap between the internal panel surface of the display panel and an inner surface of the diffuser screen directed toward the internal panel surface, the gap being filled at least in part with at least one viscoelastic filler material having an optical refractive index substantially identical to that of the display panel; and
a light-emitting device by which at least one light beam is projected through the diffuser screen onto the display panel.

13. A projection method, comprising:
projecting an image onto a display panel; and
at least at times during projection of the image onto the display panel, imparting to a diffuser screen an oscillating motion with respect to the display panel, through which diffuser screen at least one light beam of the image projected onto the display panel is transmitted, and which diffuser screen is spaced away from the display panel by a gap filled at least in part with at least one viscoelastic filler material having an optical refractive index substantially identical to that of the display panel.

* * * * *